T. E. HARRINGTON.
AUTOMATIC GATE.
APPLICATION FILED JULY 26, 1921.
1,426,062.
Patented Aug. 15, 1922.
3 SHEETS—SHEET 2.
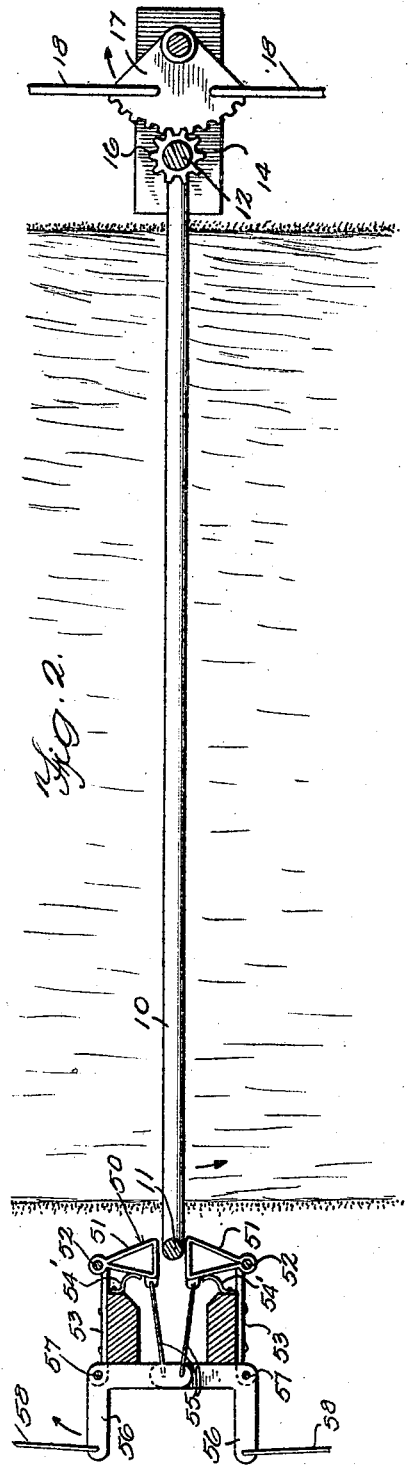
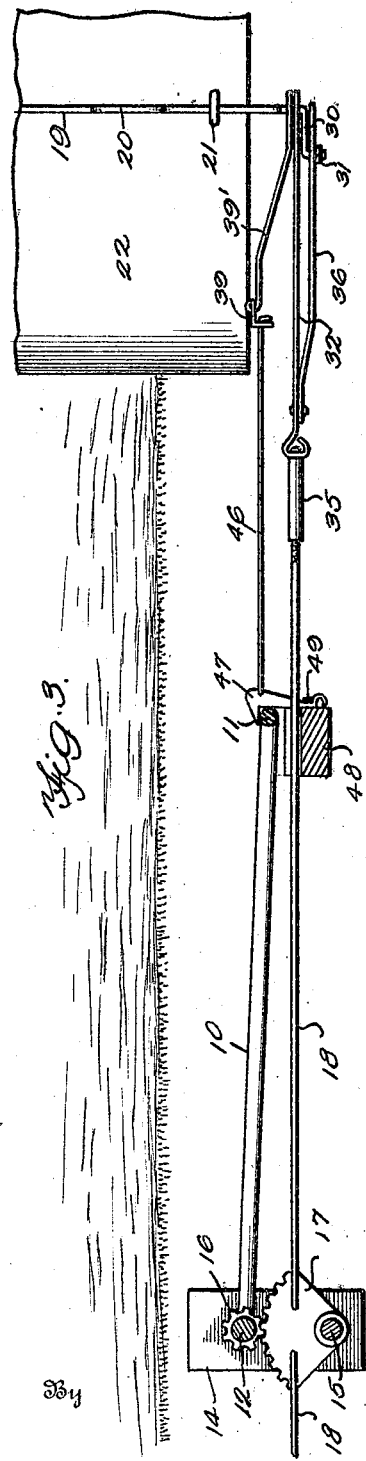
Inventor
T. E. Harrington
Attorney

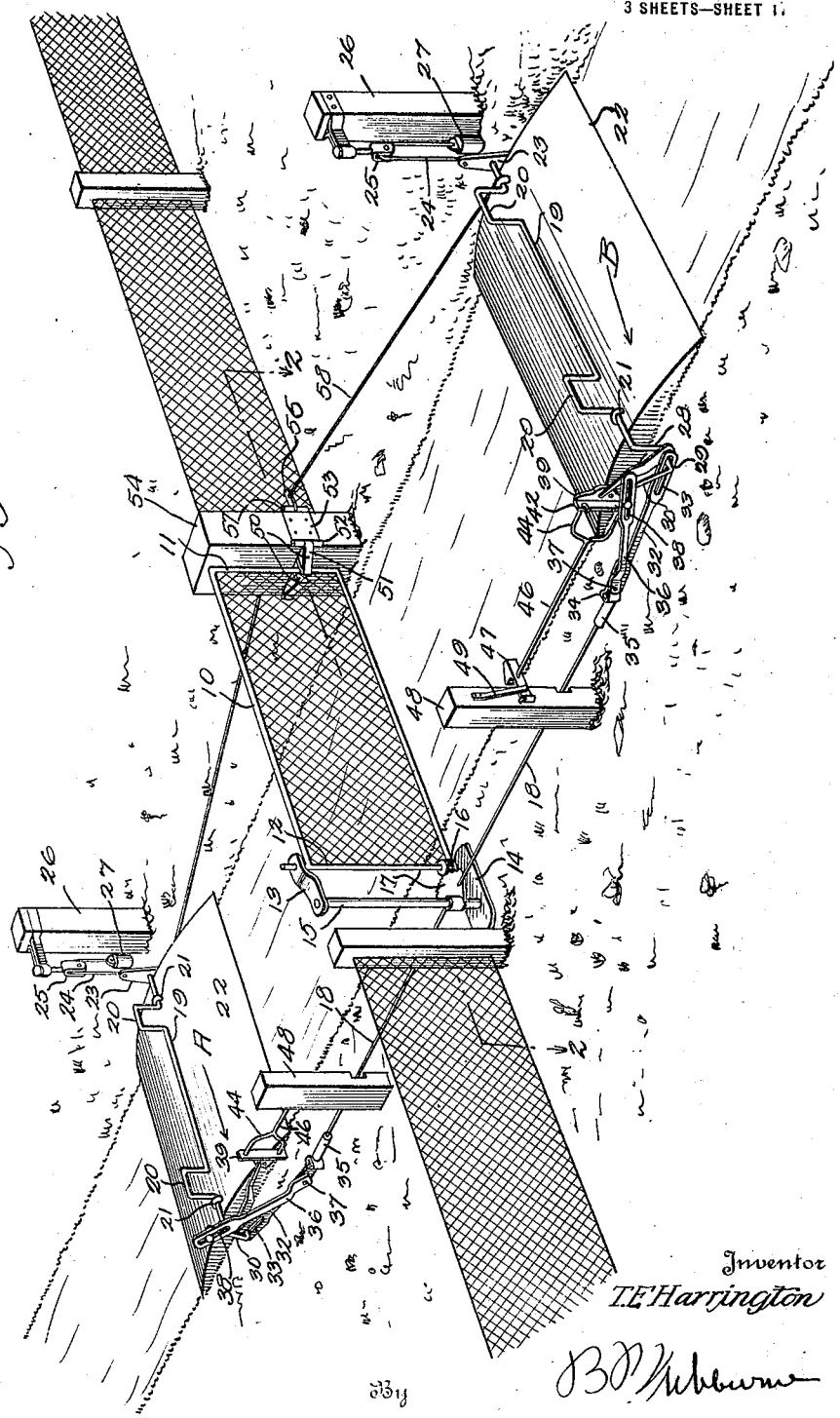

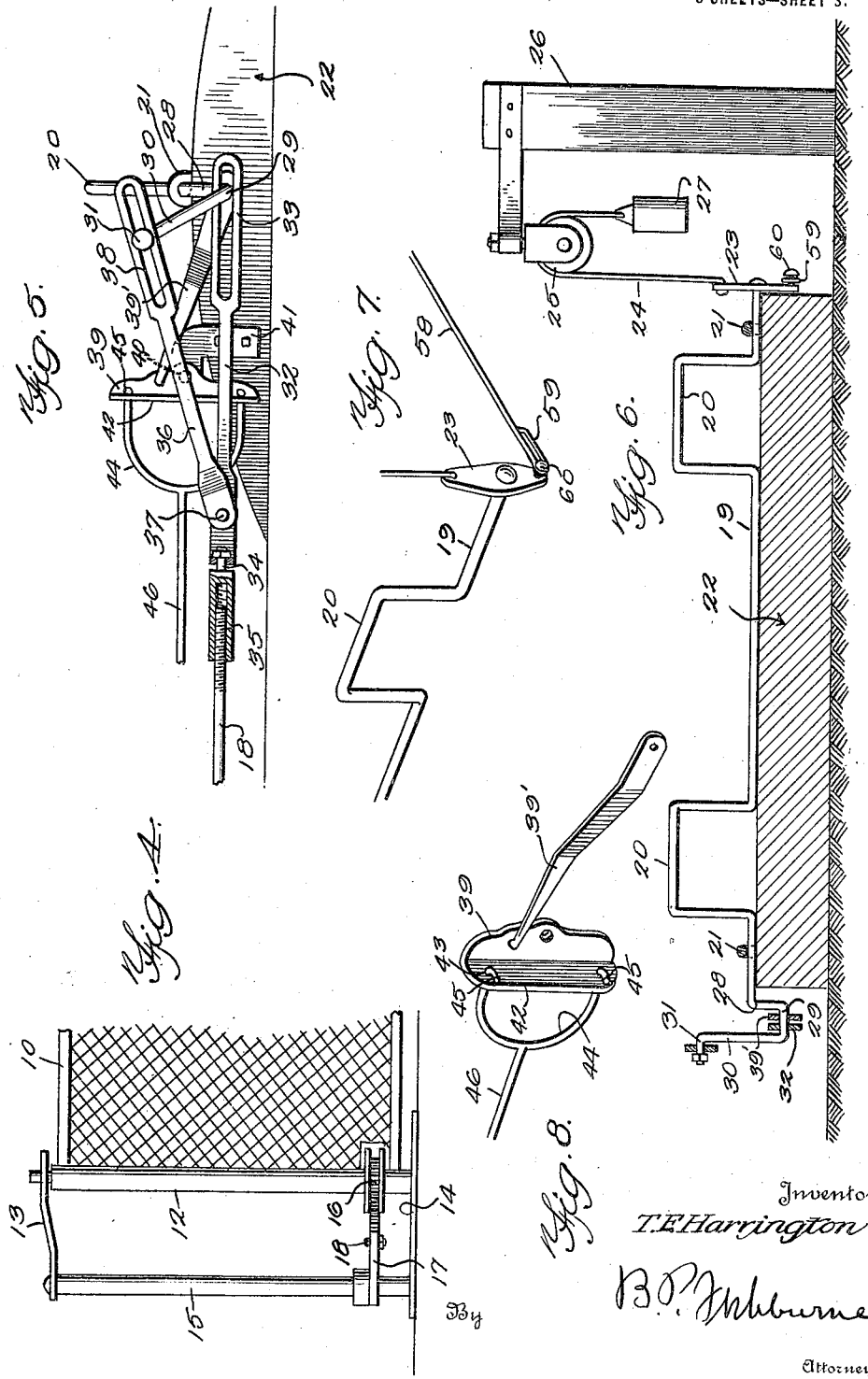

UNITED STATES PATENT OFFICE.

THOMAS E. HARRINGTON, OF SILVER CITY, NEW MEXICO.

AUTOMATIC GATE.

1,426,062.  Specification of Letters Patent.  Patented Aug. 15, 1922.

Application filed July 26, 1921. Serial No. 487,730.

*To all whom it may concern:*

Be it known that THOMAS E. HARRINGTON, a citizen of the United States, residing at Silver City, in the county of Grant and State of New Mexico, has invented certain new and useful Improvements in Automatic Gates, of which the following is a specification.

My invention relates to improvements in gates, having means actuated by a passing vehicle, to automatically swing the gate to the opened or closed position, or both.

An important object of the invention is to provide apparatus of the above mentioned character, which is wholly automatic in operation, is set into action to open the gate upon the approach of the vehicle and to close it when the vehicle reaches the opposite side of the gate and its traveling away from the gate.

A further object of the invention is to provide means whereby the gate will be swung to an open position in the direction of travel of the vehicle, irrespective of the position of the gate upon the approach of the vehicle upon either side thereof.

A further object of the invention is to provide apparatus of the above mentioned character, having means to securely lock the gate in the opened or closed position when shifted thereto.

A further object of the inventon is to provide a gate of the above mentioned character, which is reliable in operation and not liable to derangements.

Other objects and advantages of the invention will be apparent during the course of the following description.

In the accompanying drawings forming a part of this specification and in which like numerals are employed to designate like parts throughout the same, Figure 1 is a perspective view of a gate embodying my invention, Figure 2 is a horizontal sectional view taken on line 2—2 of Figure 1, Figure 3 is a plan view of one of the trip devices for actuating the gate, the gate being shown in horizontal sections, Figure 4 is a fragmentary side elevation of the gate, Figure 5 is a side elevation of the trip device, Figure 6 is a side elevation of the rock shaft or trip element of the trip device, Figure 7 is a fragmentary perspective view of the rock shaft and trip element, and, Figure 8 is a perspective view of the latch operating element.

In the drawings, wherein for the purpose of illustration is shown a preferred embodiment of my invention, the numeral 10 designates a horizontally swinging gate as a whole, having vertical ends 11 and 12. The vertical end 12, Figures 1 and 4 is extended above and below the gate 10, and is pivotally mounted at its lower end in a plate 14, and at its upper end in a plate 13. These plates are rigidly secured to a vertical stationary post 15, as shown.

The end or bar 12, constituting the pivot of the gate is provided with a gear 16 preferably near its lower end, and rigidly secured thereto. This gear is in permanent mesh with a segmental gear 17, pivoted upon the post 15 and suitably held against vertical displacement. Rods 18 are pivotally connected with the segmental gear 17 and extends upon opposite sides of the gate, to trip devices A and B, arranged suitably remote from the gate, upon opposite sides thereof.

Each trip device embodies a rock shaft or trip element 19 having laterally extending or crank positions 20. The rock shaft 19 is pivotally connected at 21 with a road plate 22.

Rigidly connected with one end of each rock shaft 19 is a crank 23, Figures 1, 6 and 7, and this crank extends above and below the rock shaft. A cable 24 is attached to the upper end of the crank 23, and is passed over a pulley 25, supported from a post 26. A weight 27 is secured to the free end of the cable 24. This weight and the associated elements serve to normally retain the cranks 20, elevated and will return the same to this elevated position when removed there from and released.

The opposite end of each rock shaft 19, Figure 1, 5, 6, is bent into an inner depending crank 28, provided at its outer end with a pivot portion 29. An outer upstanding crank 30 is formed upon the pivot portion 29 and is provided at its upper end with a pivot portion 31. The crank 30 is longer than the crank 28 and is disposed at an angle with relation thereto. As more clearly shown in Fig. 5, the pivot 29 of each crank 30 is spaced a short distance from the outer end wall of the slot 33, and this provides suitable play between the parts, so that when one rod 18 is moved longitudinally away from the gate, the other rod 18 which may move slightly in the same direction with the first named rod 18, will not turn its corresponding rock shaft 19.

A link 32 has a slotted portion 33, receiving the pivot portion 29. This link has its inner end provided with a swiveled connection 34 with a turn-buckle, 35 having screw-threaded engagement with the outer end of the rod 18.

It is obvious that the slack in the rod 18 and associated elements may be taken up by adjusting the turn-buckle 35. An upper angularly arranged link 36, is pivoted at 37, with the link 32, and is provided with a slotted portion 38, receiving the pivot portion 31 of the crank 30. The pivoted portion 31 is arranged within the outer end of the slot 33.

The numeral 39 designates a vertically swinging latch shifting levers one of which is arranged adjacent to each trip device. This lever is pivoted at 40 upon a support 41. A rigid link 39' is pivoted to the lever 39 above its pivot 40 and is also pivoted upon the pivot element 29. This rigid link swings lever 39 when the link is moved in either direction.

The lever 39 has a laterally extending flange 42, provided with apertures 43, slidably receiving arms of a U-shaped pull 44, the ends of the arms being bent laterally, forming stops or heads 45. The U-shaped pull 44, is connected with a rod 46, connected with a latch 47. This latch is pivoted upon a post 48, to swing horizontally, and is moved to the closed position by spring 49. The function of the latch 47 is to engage the end 11 of the gate and to hold the same in the opened position until the trip device is actuated to close the gate.

The numeral 50 designates a pair of horizontally swinging latches having outer beveled faces 51. These latches are pivoted at 52 upon brackets 53 secured to a post 54. The latches 50 are swung outwardly by springs 54', and are shifted inwardly by links 55, secured thereto and to bell-crank levers 56, Figure 2. Attention is called to the fact that the bell-crank lever 56 upon one side of the gate 10 is connected with the latch 50 upon the opposite side of the gate. The bell-crank levers 56, are pivoted at 57 to swing horizontally and are connected at their outer ends with rods 58, which terminate in elongated loops or eyes 59, receiving a pin or bolt 60 secured to the lower end of the crank 23. The pin 60 is in the outer end of the loop 59 when the crank 23 is vertical.

The operation of the gate is as follows:

The gate 10 may be closed, as in Figure 1, and a vehicle, such as an automobile, approaching the gate from the left, passes over the trip device A. When the wheels of the vehicle contact with the cranks 20, the rock shaft 19 of the trip device A will be turned clock-wise. This will swing the inner depending crank 28 to the left and draw the rod 18 to the left, Figure 1. The segmental gear 17 will be swung to the left and the gear 17 turned to the right, whereby the gate 10 will be swung to the right to the open position. In order that the gate may be released for this swinging movement, when the rock-shaft 19 of trip device A is thus turned clock-wise, the pin 60 on the lower end of crank 23 is shifted to the left, and the latch 50 upon the right side of the end 11 of the gate is drawn inwardly to release the end 11. When the gate is shifted to the outer position, it automatically engages behind latch 47, and contacts with the post 48. The gate is thus held open until the vehicle wheels engage the cranks 20 of the trip device B, whereby the rock shaft 19 of this trip device is turned clock-wise. This turning movement of the rock-shaft 19 in trip device B shifts crank 28 to the left which is now idle in slot 33, while the pivot portion 31 of the crank 30 will engage the end wall of the slot 38, and shift the link 36 to the right, Figure 5. The rod 18 of the gate 10 is thus shifted to the right and the segmental gear 17 turned clock-wise and the gear 16 counter clock-wise and the gate 10 closed, the end 11 engaging between the latches 50. In order that the latch 47 may release the gate 10, to permit its closing, when the rock shaft 19 of trip device B was turned clock-wise, the crank 28 pushed the link 39' to the left, swinging the lever 39 upon its pivot, and moving its lower end to the right. The upper arm of the U-shaped pull device 44 will slide in the aperture 43, and the lower arm is pulled to the right and the rod 48 is pulled to the right, and latch 47 shifted outwardly. Particular attention is called to the fact that the lever 39 is connected with the rock-shaft 19 so that it is swung upon its pivot when the rock-shaft is turned in either direction, and the U-shaped pull is so associated with the lever that the latch 47 is opened when the lever 39 is swung in either direction. This is important as it permits of the gate being released, irrespective of the position it may occupy. Thus, the gate might be left locked in the open position to the right, Figure 1, and an automobile might be approaching the gate from the right over the trip device B. When the rock-shaft 19 is so turned counter clock-wise, the latch 47 upon the right side of the gate will release the gate, and the gate would be shifted to the closed position and then to the open position upon the left side of the gate opening. The gate would then close when the vehicle passed over the trip device A upon the left side of the gate. The weights 27 return the cranks 20 and associated elements to the normal position.

It is to be understood that the form of my invention herewith shown and described is to be taken as a preferred embodiment of the same and that various changes in the shape, size, and arrangements of parts, may be resorted to without departing from the spirit of my invention or the scope of the subjoined claims.

Having thus described my invention, I claim:

1. The combination with a horizontally swinging gate, of a trip device arranged upon each side of the gate, said trip device embodying a pair of cranks, a pair of slotted links connected with the cranks so that one crank is adapted to move its link in one direction, and the other crank adapted to move its link in one direction, operative connecting means between each pair of links and the gate to swing the gate, latch means to normally lock the gate in the closed position and connected with the trip device, and latch means to lock the gate in the open position and connected with the trip device.

2. The combination with a horizontally swinging gate, of trip devices upon opposite sides thereof, each trip device embodying a pivoted element having a pair of oppositely extending cranks provided with pivot portions, a slotted link receiving the pivot portion of one crank, a second slotted link receiving the pivot portion of the other crank, means to turn the gate, means connecting the slotted links with the turning means, latch means for normally locking the gate in the closed position, connecting means between the latch means and the trip devices, and means to hold the gate in the open position when swung thereto.

3. The combination with a horizontally swinging gate, of trip devices arranged upon opposite sides thereof, each trip device embodying a transverse rock shaft having an upwardly extending element to be depressed by a vehicle, a crank connected with one end of the rock shaft and extending above and below the same, weight means connected with the inner end of the crank and serving to normally hold the rock shaft in one position, a pair of oppositely extending cranks formed upon the opposite end of the rockshaft and having pivot portions, a slotted link receiving one pivot portion a second slotted link receiving the other pivot portion, means to swing the gate horizontally, connecting means between the swinging means and the slotted links, latch means to normally lock the gate in the closed position, connecting means between the latch means and the lower ends of the first named cranks and means for holding the gate in the open position when shifted thereto.

4. The combination with a horizontally swinging gate, of a gear secured thereto, a co-acting pivoted gear engaging the first named gear, a pair of connected oppositely extending cranks having pivot portions, a slotted link receiving one pivot portion, a second slotted link receiving the other pivot portion, and connecting means between the links and the second named gear.

5. The combination with a horizontally swinging gate, of latches arranged upon opposite sides thereof to hold the gate in the open position, a pivoted lever arranged near each latch and having apertures, a U-shaped pull having its arms slidable within the apertures and provided at their ends with stops, means for connecting the pull with the latch, a trip element connected with the lever to operate it, and means to swing the gate connected with the trip element.

6. The combination with a horizontally swinging gate, of trip devices arranged upon opposite sides thereof, each trip device embodying a rock shaft having a normally upstanding crank, means for normally retaining the crank in the upstanding position, a pair of oppositely extending cranks connected with the rock shaft and having pivot portions, a pair of connected links having slots to receive said pivot portions, means to swing the gate horizontally, connecting means between the swinging means and the slotted links, a latch to hold the gate in the open position, a pivoted lever having a pair of apertures, arms slidable within the apertures and having stops, connecting means between the arms and the latch, a link connected with the lever and with one pivot portion, latch means to normally hold the gate in the closed position, and connecting means between the latch means and the trip devices.

7. In a gate operating device, as a subcombination, a latch and pivoted lever having a pair of apertures, a pair of arms slidable in the apertures and having stops, connecting means between the arms and latch, and means to swing the lever.

8. In a gate operating device, the combination with a swinging gate, means to turn the gate, a pair of links pivotally connected and connected with the turning means, said links having longitudinal slots, a pair of cranks extending in opposite directions and having pivot portions inserted within the slots of the links, and means to turn the cranks.

THOMAS E. HARRINGTON.